(12) United States Patent
Glaser

(10) Patent No.: US 8,041,604 B1
(45) Date of Patent: Oct. 18, 2011

(54) METHOD OF EMBEDDING ADVERTISEMENTS IN COMMUNICATION

(75) Inventor: Lawrence F. Glaser, Fairfax Station, VA (US)

(73) Assignees: Studebaker & Brackett PC, Reston, VA (US); Nixon Peabody LLP, Rochester, NY (US)

( * ) Notice: Subject to any disclaimer, the term of this patent is extended or adjusted under 35 U.S.C. 154(b) by 0 days.

(21) Appl. No.: 09/270,710

(22) Filed: Mar. 16, 1999

(51) Int. Cl.
*G06Q 30/00* (2006.01)
*G06F 9/445* (2006.01)

(52) U.S. Cl. ........................................ 705/14.4; 717/174

(58) Field of Classification Search .................. 705/14, 705/14.4, 26
See application file for complete search history.

(56) References Cited

U.S. PATENT DOCUMENTS

| | | | | |
|---|---|---|---|---|
| 5,105,184 A | * | 4/1992 | Pirani et al. | 345/629 |
| 5,504,675 A | | 4/1996 | Cragun et al. | 705/14 |
| 5,513,254 A | * | 4/1996 | Markowitz | 379/100.17 |
| 5,515,098 A | | 5/1996 | Carles | 705/35 |
| 5,557,721 A | | 9/1996 | Fite et al. | 705/14 |
| 5,710,887 A | | 1/1998 | Chelliah et al. | 705/26 |
| 5,715,018 A | | 2/1998 | Fasciano et al. | 348/722 |
| 5,724,424 A | | 3/1998 | Gifford | 705/79 |
| 5,724,521 A | | 3/1998 | Dedrick | 705/26 |
| 5,740,549 A | | 4/1998 | Reilly et al. | 705/14 |
| 5,745,882 A | | 4/1998 | Bixler et al. | 705/26 |
| 5,765,141 A | | 6/1998 | Spector | 705/14 |
| 5,774,868 A | | 6/1998 | Cragun et al. | 705/10 |
| 5,838,790 A | | 11/1998 | McAuliffe et al. | 380/4 |
| 5,848,397 A | | 12/1998 | Marsh et al. | 705/14 |
| 5,905,492 A | * | 5/1999 | Straub et al. | 715/744 |
| 5,937,037 A | * | 8/1999 | Kamel et al. | 379/88.19 |
| 5,974,398 A | | 10/1999 | Hanson et al. | 705/14 |
| 6,018,761 A | * | 1/2000 | Uomini | 709/206 |

(Continued)

FOREIGN PATENT DOCUMENTS

JP 10320314 A * 12/1998

(Continued)

OTHER PUBLICATIONS

Anonymous, "World Wide Watch", Electronic Times, Oct. 5, 1998, No. 920, p. 22.*

(Continued)

*Primary Examiner* — Yehdega Retta
(74) *Attorney, Agent, or Firm* — Studebaker & Brackett PC; Donald R. Studebaker

(57) ABSTRACT

A system and method for advertising wherein a communication from a sending party to a receiving party includes one or more advertisements. Such communication could include one or more of an email, a voice mail, a voice communication (i.e. a telephone call or internet based telephony communication), a facsimile message, a pager message, or any other suitable electronic communication. In a preferred embodiment, the communication is an email sent from a sending party to a receiving party, wherein the email includes an advertisement for a product or service used by the sending party. Such advertisement could include a "testimonial" from the sending party, who's credibility is established with the receiving party. In another preferred embodiment, the advertisement could be for a software program installed and operated on a computer system used by the sending party. The advertisement is included in the email message of the sending party as a result of an election made by the sending party during installation of the software program. The advertisements can be structured in a multi-level marketing type organization including trusted and credible reporting systems to account for each participant's advertising efforts.

39 Claims, 4 Drawing Sheets

U.S. PATENT DOCUMENTS

| | | | |
|---|---|---|---|
| 6,029,141 A * | 2/2000 | Bezos et al. | 705/27 |
| 6,047,310 A * | 4/2000 | Kamakura et al. | 709/201 |
| 6,055,510 A | 4/2000 | Henrick et al. | 705/14 |
| 6,061,660 A | 5/2000 | Eggleston et al. | 705/14 |
| 6,061,695 A * | 5/2000 | Slivka et al. | 715/203 |
| 6,205,432 B1 * | 3/2001 | Gabbard et al. | 705/14 |
| 6,285,991 B1 * | 9/2001 | Powar | 705/76 |
| 6,292,789 B1 * | 9/2001 | Schutzer | 705/40 |
| 6,360,206 B1 * | 3/2002 | Yamashita | 705/14 |
| 6,424,426 B1 * | 7/2002 | Henry | 358/1.15 |
| 6,510,453 B1 * | 1/2003 | Apfel et al. | 709/206 |
| 6,525,747 B1 * | 2/2003 | Bezos | 345/751 |
| 6,564,193 B1 * | 5/2003 | Shore et al. | 705/400 |

FOREIGN PATENT DOCUMENTS

| | | |
|---|---|---|
| WO | WO96/24213 A1 * | 8/1996 |

OTHER PUBLICATIONS

Anonymous, "A Unique Email Advertisement", published at web address of AdventuresinMarketing, Jun. 5, 1998.*

Anonymous, "Try it Before You buy it Special! 45 Million Email Leads + Next Generation Mailers", published at web address of xtdnet.nl, Mar. 9, 1997.*

Anonymous, "World Wide Watch", Electronic Times, Oct. 5, 1998, No. 920, p. 22.*

Merriam-Webster's Collegiate Dictionary, 10th Edition, 1997, p. 70.*

Merriam-Webster's Collegiate Dictionary, 10$^{th}$ edition, 1997, p. 18.*

"Tuning to the Internet", Harris, Kellee; Sporting Goods Business, San Francisco, Nov. 1995, vol. 28, Iss. 11 p. 15.*

"Taming the Net: A new marketing forum", Mack, John, Pharmaceutical Executive, Eugene: Nov. 1995, vol. 15, Iss. 11; p. 56, 5 pgs.*

"First Virtual Holdings' New Technology Places Mini-Websites in Email"; Business Wire; Dec. 10, 1997.

"AdTech Conference-Exhibitors Fill Shows with Wares"; Newsbytes News Network; Mar. 27, 1997.

"Mercury Expands Email-Based Consumer Cross Targeting"; Interactive Marketing News; Mar. 28, 1997; col. 4, No. 3.

* cited by examiner

To: lglaser@fortran-corp.com ~6
From: Eric <erobin@sixbey.com> ~5
Subject: New Installation Meeting -- 9:00 am, 03/17/99 ~7
Cc:
Bcc:
Attached:

~2

Larry:

The meeting for the Greensboro installation has been rescheduled for 9:00 am tomorrow. If possible, please bring the revised network topology diagrams so we can discuss. I hope you can make it and look forward to seeing you there.

Best regards, ~3

Eric

~4
+----------------------------------------------+
 PRO-CAD SOFTWARE 
Number one in the industry and number one for me!
http://www.pro-cad.com
+----------------------------------------------+

Fig. 1

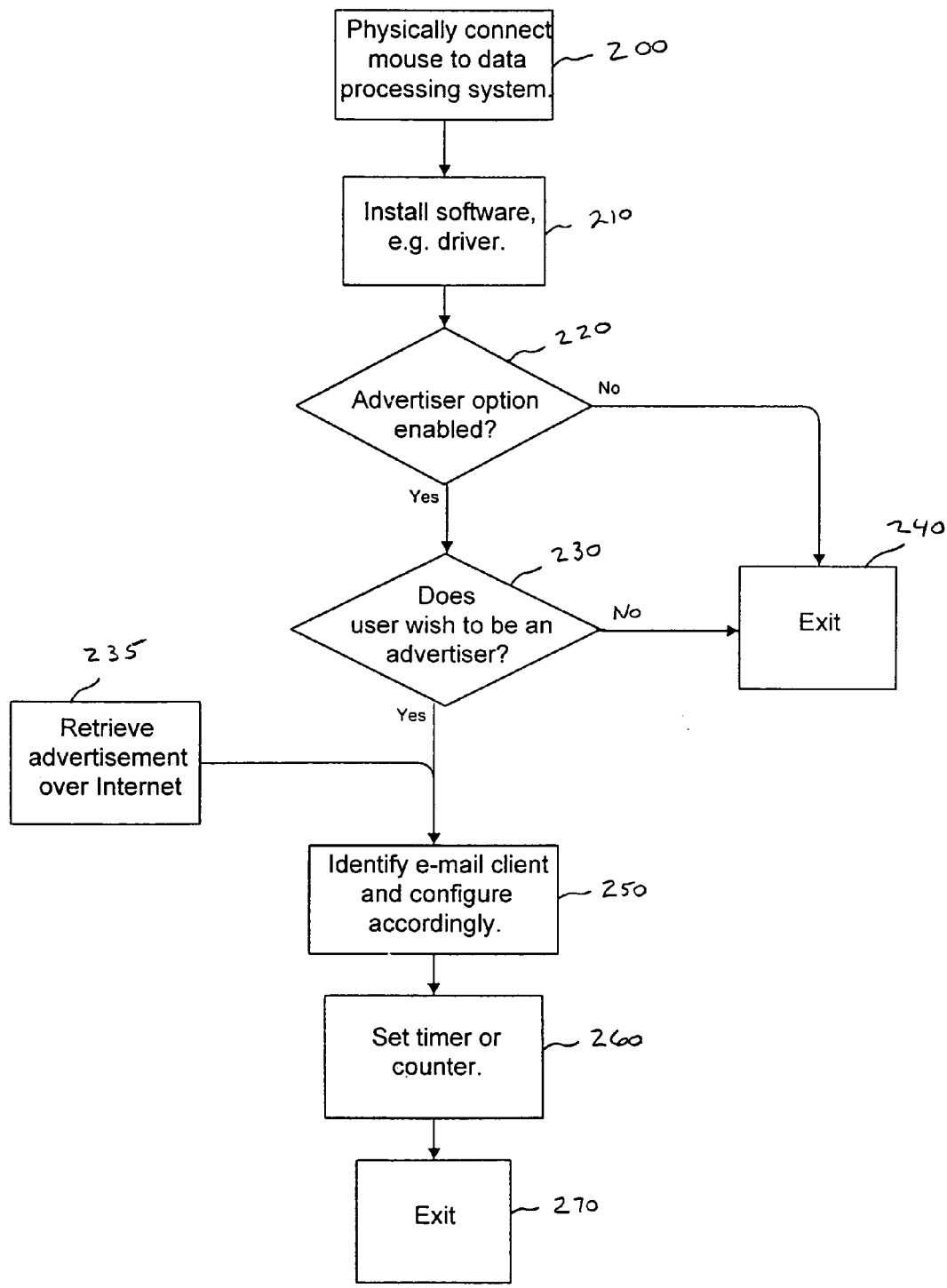

METHOD OF EMBEDDING ADVERTISEMENTS IN COMMUNICATION

The present invention is directed to a system and method of interactive advertising, and more particularly to a system and method of generating an interactive advertisement, coupon or any other like message, embedding and transmitting the same, and updating the interactive advertisement when warranted. The present invention is directed also to a system and method of multi-level marketing in cooperation with the method of interactive advertising.

BACKGROUND OF THE INVENTION

Advertising is an essential element of any successful business enterprise. Without having the consumer learn about a producer's or manufacturer's product or service, the consumer will not know of that product or service and will therefore not be prone to buying, subscribing, renting, leasing and/or obtaining that product or service. Furthermore, where a number of various competing products exist, it is important to obtain product differentiation in order to achieve a large market share.

Typically, advertising is accomplished via broadcasting, whether it be a television or radio commercial, billboard, magazine, newspaper, or more recently Internet based advertisement. That is, an advertiser places a single advertisement in a particular media and hopes that those people who might be most interested will see and be influenced by that advertisement. Unfortunately, this strategy can be wasteful since only a very small fraction of the people who will view or hear the advertisement will ever have any intention of acting on the information provided therein. In this regard, millions of dollars are spent by advertisers in order to place advertisements in media pertaining to a demographic that corresponds to the product or service being advertised.

Furthermore, as most people understand, advertisements are usually produced by advertisement agencies and people have become increasingly skeptical of any claims made in connection with a particular product or service. In some instances, celebrity testimonials are used in order to gain the confidence of consumers and convince them that the product or service is advantageous from other competing products or services. Such testimonials, however, have been overused and are of decreasing significance in actually persuading consumers to purchase a product or service.

Further still, due to the fast pace of certain markets, particularly the computer, Internet and data processing fields, by the time an advertisement is prepared by an advertisement agency, and thereafter printed in a publication the advertisement may no longer be intriguing or "eye catching."

To overcome some of the above deficiencies, advertisers have resorted to the Internet and the ever expanding user base thereof. Typically, Internet based advertisements will be in the form of a "banner," which is a graphic image displayed on a web browser of a person accessing the Internet. This "banner" may be animated and will include a message to a visitor of the Internet site generally encouraging the user to "click" the banner and thus access another site for more detailed information on the product or service being advertised. While such advertisements can be quickly and cheaply generated, they still suffer from many of the deficiencies of traditional advertisers; namely difficulties in targeting desired audiences and low effectiveness.

Conventional advertisements, however, including internet "banner" advertisements are often transitory and are lost or forgotten after being viewed by a potential purchaser. Even if a user revisits an Internet site, the advertisement previously displayed is often replaced by another, different advertisement since such sites routinely change or rotate the displayed advertisement. Similarly, many broadcast advertisements are lost after being viewed by the consumer and thus the consumer can no longer locate advertisement related information in the event they later decide to purchase the advertised product or service.

Another Internet based approach has been developed in order to more accurately target possible consumers. This approach operates in connection with one of the many Internet based search engines, such as that found at www.metacrawler.com, www.lycos.com, or www.altavista.com for example. When a user queries the search engine, context sensitive advertisements are displayed together with the users search results. Thus, if the user queries on "Hawaii travel," for example, his search results will include banner advertisements for travel related services. While such advertisements are more directly targeted, they reach a relatively smaller audience than do broadcast advertisements.

With the recent almost universal acceptance of electronic mail (e-mail), advertisers have also begun to use unsolicited commercial e-mail (UCE), commonly referred to as SPAM, to advertise their products and services. UCE, however, is often viewed with disgust by recipients since it is viewed as invading the user's privacy, clutters their computer system, and may adversely affect the operation thereof. As such, most users delete such messages without reading them, and those that do read them often form unfavorable opinions of the products and services offered due to their negative impressions of the form of delivery and the interruption. Therefore, many advertisers avoid the use of UCE in fear that the image of their product or service will in fact be harmed.

Other forms of advertising are continuing to become more prevalent as advertisers look for better ways to reach consumers. Once such advertisement is found in voice communications made using a standard public switched telephone system. When placing a long distance call, for example, a short recording is played to the originator to indicate the brand of long distance service being used. As a further example, when a user contacts an operator or directory assistance, a recording indicates to the user the name of the telephone company that the user is connected with. While this provides further advertisement for the companies involved, such recording is only evident to the person initiating the communication, who often already subscribes to or uses the service being advertised. Therefore, while such advertisement may be useful to maintain brand loyalty, it is ineffective to recruit new customers to the companies product or service.

It is clear that a need exists for a new system and method for advertising that overcomes the above deficiencies by providing a system and method that delivers advertisements to consumers in a useful, valuable, meaningful, locally stored and interactive fashion.

SUMMARY OF THE INVENTION

In view of the above, it is an object of the present invention to provide a system and method of advertisement that overcomes the deficiencies of traditional advertising systems and methods.

It is a further object of the present invention to provide an advertising system and method in which a communication directed from a first party to a second party includes an advertisement that is received by the second party.

It is another object of the present invention to provide an advertising system and method in which a point-to-point communication includes an advertisement.

It is yet a further object of the present invention to provide such an advertising system and method in which the point-to-point communication is a private communication between a first sending party and a second receiving party.

It is a still further object of the present invention to provide such an advertising system and method in which the private communication is one of an electronic mail, a facsimile transmission, a telephone message, a pager message, or a video message.

It is another object of the present invention to provide a system and method for advertising wherein an electronic communication automatically includes an advertisement embedded therein.

It is a further object of the present invention to provide such an advertising system and method wherein a data processing system (including a workstation or server) used to originate the message embeds an advertisement therein.

It is a still further object of the present invention to provide such an advertising system and method in which the product or service being advertised is operated or used in conjunction with the data processing system originating the message that includes the advertisement.

It is another object of the present invention to provide such an advertising system and method in which a product being advertised is a peripheral device connected with the data processing system originating the message.

It is another object of the present invention to provide such an advertising system and method in which the product being advertised is a software program operating on the data processing device originating the message.

It is a still further object of the present invention to provide such an advertising system and method in which the data processing device accesses an external server, such as an Internet based server, to obtain fresh and/or current advertising information to include in the originated message.

It is yet another object of the present invention to provide such an advertising system and method in which the advertisement is transmitted from all communications originating from the data processing device for a predetermined period of time, after which the advertisements are no longer sent.

It is still another object of the present invention to provide such an advertising system and method in which a user of the data processing system is provided with an option to advertise a product upon installation of that product on the data processing system.

It is yet another object of the present invention to provide such an advertising system and method in which a user of the data processing system receives a benefit in exchange for her commitment to advertise a product used in connection with the data processing system.

It is yet another object of the present invention to provide such an advertising system and method in which the user of the data processing system receives at least one of remuneration, free products or services, or enhanced services in exchange for his commitment to include advertisements in communications originated from, or initiated by, that data processing device.

It is yet another object of the present invention to provide an advertising system and method in which an endorsement of a product or service is included in the advertisement.

It is a still further object of the present invention to provide such a system and method for advertising wherein a recipient of an electronic communication including an embedded advertisement is made aware that the sender (or chain of senders) of the communication uses, supports, or otherwise advocates the product or service being advertised.

It is another object of the present invention to provide such an advertising system and method wherein an endorsement for the product or service is from a person trusted by the recipient of the advertisement, thereby increasing the effectiveness of the advertisement.

It is yet another object of the present invention to provide such an advertising system and method wherein an endorsement for the product or service is from a chain of people trusted by the recipient of the advertisement, thereby increasing the effectiveness of the advertisement.

It is a still further object of the present invention to provide an advertising system and method wherein advertisements are accumulated in communications between a sending party and a plurality of recipients.

It is another object of the present invention to provide such a system wherein each successive communication includes only advertisements that are common to all parties have received and forward the message, thus strengthening the testimonial effectiveness of the advertisement.

It is a still further object of the present invention to provide an advertisement system and method that conveniently and efficiently delivers a coupon to a consumer that can used to obtain discounted or free products or services.

It is another object of the present invention to provide such a system wherein the coupon is electronically delivered to a consumer and is printed by the consumer for later redemption.

It is a still further object to provide such a system and method wherein a virtual coupon is generated that may be electronically redeemed by the recipient of the coupon for discounted or free products or services.

It is another object of the present invention to provide such a system and method wherein a coupon decreases in value over time once received by a recipient until it either expires or is redeemed by the recipient.

It is yet a still further object of the present invention to provide such a system and method wherein a coupon increases or changes in value over time once received by a recipient until it either expires or is redeemed by the recipient.

It is yet a further object of the present invention to provide an advertising system and method in which advertisements are more specifically directed to consumers that are likely to purchase the product or service being advertised.

It is an object of the present invention to provide such an advertising system and method in which advertisements are directed to friends and acquaintances of a consumer that has elected to use the product or service being advertised and/or has agreed to advertise such product or service.

It is yet another object of the present invention to provide a system and method for advertising in which recipients of the advertisement are given an option of further advertising the product or service, and optionally receiving a benefit in response to their agreement to do so.

It is a further object of the present invention to provide such a system wherein such advertising is automatically included in subsequent communications initiated by such recipients.

It is a still object of the present invention to provide such an advertising system and method in which a multi-level marketing type system is implemented wherein an original advertiser of a product or service is compensated not only for advertisements he originates, but also for advertisements originated by parties who have agreed to become advertisers in response to a communication from that original advertiser.

Is a further object of the present invention to provide a system and method for advertising wherein a recipient of an advertisement for a product or service is provided an opportunity to further advertise that product or service.

It is another object of the present invention to provide such a system and method wherein the recipient electing to further advertise the product or service is compensated for doing so, such compensation including remuneration, free products or services, or enhanced services.

It is still another object of the present invention to provide such an advertising system and method in which a communication that is sent by a first sending party, is intercepted by a third advertising party, an advertisement there being embedded in the communication, and is thereafter sent to a second receiving party.

It is another object of the present invention to provide a system and method for advertising wherein advertisements are more specifically targeted to a desired market audience.

It is a further object of the present invention to provide such a system and method wherein advertisements are embedded within communications from a first party to a market audience that values the judgment and opinion of that first party.

It is a still further object of the present invention to provide such a system wherein a personal relationship between a sending party and a receiving party strengthens the advertisement and reduces the likelihood of the receiving party forming a negative impression of the advertised product or service.

It is yet another object of the present invention to provide an advertisement that can be quickly and easily found by a consumer at a later time, if desired.

It is a further object to provide such a system wherein an electronic record of the advertisements received by a consumer can be automatically searched to locate such a desired advertisement.

These and other objects of the invention are achieved by providing a system and method for advertising wherein a communication from a sending party to a receiving party includes one or more advertisements. Such communication could include one or more of an email, a voice mail, a voice communication (i.e. a telephone call or internet based telephony communication), a facsimile message, a pager message, a video message, or any other suitable electronic communication.

In one preferred embodiment, the communication is an email sent from a sending party to a receiving party, the email including an advertisement for a product or service used by the sending party. Such advertisement could include a "testimonial" from the sending party, who's credibility is established with the receiving party. In a preferred embodiment, the advertisement could be for a software program installed and operated on a computer system used by the sending party. The advertisement is included in the email message of the sending party as a result of an election made by the sending party during installation of the software program.

BRIEF DESCRIPTION OF THE DRAWINGS

The present invention will be more fully understood upon reading the following Detailed Description in conjunction with the accompanying figures, in which reference numerals are used consistently to indicate like elements, and in which:

FIG. 1 shows an e-mail message including an advertising area in accordance with one preferred embodiment of the present invention.

FIG. 2 depicts a flow diagram showing a setup procedure in accordance with the present invention.

DETAILED DESCRIPTION OF THE INVENTION

Figure 3:
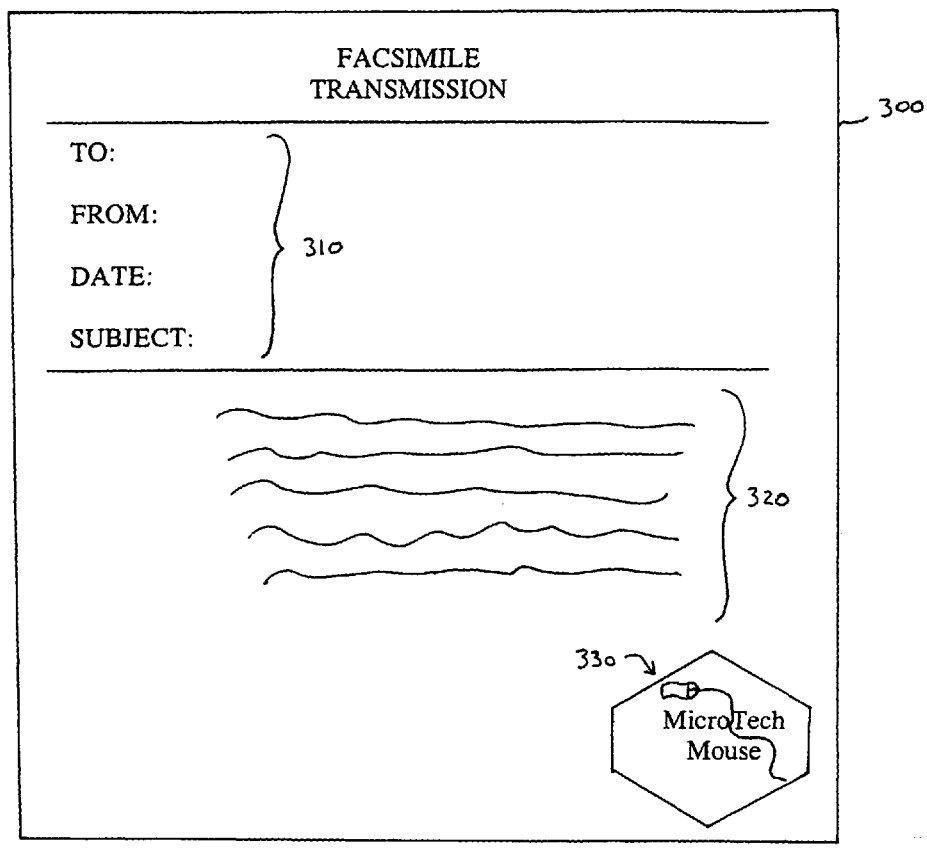
FIG. 3 illustrates a typical facsimile cover page including an advertisement in accordance with the present invention.

The present invention will now be described with reference to the figures. FIG. 1 depicts an e-mail message 1 in accordance with one preferred embodiment of the present invention. E-mail message 1 shown in FIG. 1 will generally be an intended communication from a sender to a recipient. That is, e-mail message 1 will not be UCE or SPAM that is typically broadcast to a very large number of recipients. Rather, e-mail message 1 will intentionally be generated by a sender, forwarded by that sender to the recipient, and will in the most preferred embodiment include a personal or business related message wholly separate from any advertisement contained therein.

In FIG. 1, email message 1 is originated by sender 5 and intended for recipient 6. E-mail message 1 also can include the conventional "date sent," (not shown), "subject" 7 and other header information, as well as an area 2 for the substance (body) of the e-mail message, such as a personal greeting or business related information. Additionally, there may also be a signature area 3 wherein the originating e-mail client automatically adds a signature to each e-mail sent. Signatures typically include the e-mail sender's name and address, although any preset relatively small amount of text can be implemented as a signature.

In accordance with the present invention, in addition to the conventional aspects of e-mail message 1, there is provided an advertisement area 4. While shown below the signature area 3 in FIG. 1, the advertisement area 4 can be positioned anywhere in the e-mail message 1, including before, or for effect, even interspersed with, the header information or within area 2 of the e-mail message 1. Also, in accordance with one preferred embodiment of the present invention advertisement area 4 is in fact part of the e-mail signature appearing in signature area 3. Furthermore, the advertisement contained in advertisement area 4 could be any suitable advertisement including an animated display (i.e. banner, icon, sprite) or could include a novelty or game that is designed to attract the attention of the recipient. Thus, as will be understood, the present invention is not directed to the specific form and content of the advertisement. In one preferred embodiment, the advertisement includes a hyperlink to another resource of information, such a link to the world wide web as shown in FIG. 1. Thus, if a recipient desires more information on the advertised product or service he can visit the linked site for more information. Also, if the recipient wishes to join the group of advertisers (thus creating or joining a "multi-level" advertising hierarchy), he may visit the linked data source to complete such process.

Furthermore, the advertisement could be tailored to the demographic of the recipient. That is, the advertisement could be in a native language of the recipient. As another example, the advertisement could be for one product if the recipient is in a first geographic region while it could be for a second product if the recipient is in a second geographic region. The information on the recipient could be determined from the recipient's email or IP address, as well as from a user profile provided through, for example, an Internet portal. Furthermore, the known psychology of advertising (i.e. gender stereotyping, age targeting, income targeting, etc.) can be employed by accessing suitable information from an available user profile.

The included advertisement could be a coupon (redeemable physically or electronically) that provides reduced or free services or products. Furthermore, in accordance with the present invention, such coupon could be a diminishing value with time. That is, if redeemed within 2 days, for example, of receipt, the coupon could have full value, whereas it may only have 50% of its value if redeemed after this period. Thus, the advertisement in accordance with the present invention encourages a recipient to quickly act on the advertisement received. Furthermore, conversely, the coupon could increase in value over time until such time as a number of products or services have been redeemed, thus allowing a seller of such products or services to gradually increase the enticement to consumers until such time as his inventory is diminished.

Also, the coupon could merely change its attributes (i.e. value, redemption method or location, etc.) periodically in order to cause people to continually revisit the advertisement to see if they could receive a further discount. Thus, for example, the coupon could originally offer the recipient a 10% discount. The recipient, however, may wish to purchase the advertised product or service only if offered a 20% discount. Thus, the recipient could be encouraged to periodically recheck the advertisement/coupon to see if the coupon value is acceptable to the recipient, thus increasing exposure to the advertisement.

Advertisement area 4 displays an advertisement to a recipient of the e-mail message shown in FIG. 1. That message, unlike UCE or SPAM, will have originated from a sender and be intended for receipt by one, or a predetermined number, of recipients. Also, as described above, since the e-mail message incudes a personal or business related message, it will generally receive personal attention from the recipient, who will, in the process, be exposed to advertisement 4. Furthermore, the origination of e-mail message 1 from the sender, who will often be personally known by the recipient, lends credibility to the advertisement. The recipient will view the inclusion of this advertisement as a testimonial by the sender, whose judgment the recipient may respect and value.

In a more preferred embodiment of the present invention, the advertisement is related to particular software or hardware that is being used by the data processing system from which the e-mail message 1 was generated. When the software or hardware is installed, the installation program will offer to the user of the system an option to become an advertiser for that software or hardware. If the user accepts, the installation program will make appropriate modifications to the user's computer system so that appropriate advertisements are sent with electronic communications originating from that computer system in the manner herein described.

FIG. 2 depicts a flow diagram of how an advertisement for, for example, a newly-installed mouse would be enabled and placed in advertisement area 4 of e-mail message 1 in accordance with a preferred embodiment of the present invention. As with any new peripheral hardware equipment purchase, the mouse would first be physically connected to the data processing system or computer at step 200. Then at step 210, software related to the mouse is installed on the computer system to which the mouse has been connected. Such software typically includes drivers and/or any additional software that might be desirable or necessary for the mouse to function properly with the computer.

Then, in accordance with the present invention, the setup procedure for the mouse would proceed to step 220, which is a preset "switch" by the manufacturer that determines whether the setup procedure will conclude at that point, i.e. proceed directly to step 240, or whether the setup procedure will continue to step 230 in accordance with the present invention. Of course, step 220 is not necessary for the preferred embodiment in that the option to advertise could be included in all installation programs and not software "selectable" as in the most preferred embodiment. At step 230, the user is prompted as to whether he would like to participate as an advertiser of the mouse product that is being installed. If the user does not want to participate, the setup procedure moves to step 240 where it concludes and exits, thereby completing the mouse installation. In this instance, the setup routine performs the same functions as existing setup routines with no further modifications or changes to the user's computer system.

On the other hand, if the user decides to become an advertiser, i.e. participate, then at step 250 the mouse setup procedure queries the computer system to determine the type, and/or version of e-mail client that is being used on that particular platform. Based on the results of the query in step 250, the setup procedure properly links or correlates a particular advertisement, preferably associated with the mouse product or manufacturer with e-mail generation and transmission. In one embodiment of the present invention, the setup procedure merely includes a textual advertisement in the default signature area of the e-mail client. That is, the setup program modifies the existing default signature for the e-mail client to include a suitable advertisement. In the event that the user already includes a signature having, for example, his name and address, then such advertisement would be added to this information and placed directly below this user information.

For example, if the user operates Pegasus Mail as an e-mail client, the setup procedure will locate a file having a .PMS extension, such as LOCALSIG.PMS or INETSIG.PMS, which are standard DOS based text files. If these files do not exist, the setup program will create them, including a suitable advertisement. If these signature files do exist, the setup procedure will then add a suitable advertisement to the file. A similar procedure can be used for other e-mail clients. For example, the Eudora e-mail client includes a text file named DEFAULT.TXT that stores the default signature for that e-mail client and similar modification could be made thereto.

The embedded advertisement could include a testimonial by the user. That is, the advertisement could be worded in the first person as if it is a statement of the user himself, thus lending credibility to the advertisement. For example, the advertisement could read "I only use the best pointing device—a genuine Microtech mouse!" Thus, a recipient, who may trust and respect the sender's judgment, understands that the sender strongly believes in the advertised product or service and thus receives a very positive opinion thereof.

While the preferred embodiment discussed above is directed to a hardware component, namely a mouse, the present invention is applicable to any software or hardware device. In accordance with a further preferred embodiment of the present invention, an advertisement for a software program is embedded in the e-mail communication. With widespread adoption of the Internet, software distribution is increasingly becoming electronic, with users visiting a world wide web (WWW) site to purchase and download software. In many instances, such software is distributed as "shareware" where a user may try the software for a specified time prior to deciding whether to purchase the software. In such instances, the installation program of the software could easily be modified to embody the present invention to advertise the software. Furthermore, such advertisement could include reference (or link) to the WWW site where others who receive the advertisement could download the same software. With many e-mail clients, such a link can be directly accessed by clicking on the advertisement itself and the user's computer system will execute a web browser application and load the desired page.

Once the proper linking processes have been completed, the setup procedure proceeds to step 260 where an internal timer or counter may be set. Specifically, it might be decided by the mouse manufacturer, for example, that it would be impractical or undesirable from a marketing point of view to be advertising a particular mouse perhaps many years from the time of original installation, as products, company image and the like might change over the years and the original advertisement associated with the mouse might no longer be suitable in the overall marketing strategy of the company. Accordingly, the setup software preferably includes a timer that is preferably keyed off of the internal clock of the computer system or includes a counter that counts how many times the advertisement has been sent. The counter can be a count-up or count-down counter. Thus, after a certain date or after a predetermined number of times that the advertisement has been associated with and sent by the e-mail system, the advertisement will cease to be embedded in and transmitted along with any e-mail.

After the timer or counter has been set, i.e., enabled, the setup procedure proceeds to step 270 where it concludes and exits. The mouse can now be used in a conventional manner.

One important aspect of the present invention is that the advertisement, once linked to the e-mail system, for example, becomes a hands-off or seamless attribute from the point of view of the e-mail user. That is, like a signature of an e-mail message that a user need set only once, the advertisement associated with the mouse, for example, is enabled once and thereafter forgotten (by the user). Meanwhile, however, that advertisement is embedded and sent along with all e-mails that are sent by the user.

In accordance with this preferred embodiment, one advantage to the advertising method of the present invention is that advertisement is generated by people that are actually using the equipment being advertised. Specifically, in the case of the mouse or mouse company advertisement discussed above, the recipient of the advertisement will know that the sender of the e-mail is now using that particular kind of mouse. This is significant since testimonial types of advertising are often the best type of marketing that a company can obtain. In accordance with the present invention, therefore, it is possible for a company to obtain a significant marketing advantage.

Perhaps even more significant is that the advertisement in accordance with the present invention is not potentially wasteful as conventional broadcast-type advertising might be. The advertisement method of the present invention is point-to-point, not broadcast. In other words, each advertisement is sent to one or perhaps a limited number of people, those people being the direct recipients of the e-mail messages. And, perhaps even more important, it is quite probable that those recipients are precisely the audience (or clique) that the company that is advertising wants to target.

Also of significance is the fact that such advertising in accordance with this preferred embodiment of the present invention has little or no cost to the advertiser. Where a broadcast television advertisement that reaches 2 million people may cost hundreds of thousands of dollars, an advertisement in accordance with the present invention could be free. In many instances, however, advertisers may wish to entice or encourage users to choose to participate as an advertiser. In such instances, the company that wishes to advertise may provide discounted or reduced hardware or software prices to those that accept the offer to advertise. For example, where the advertisement is for a shareware software program, agreement to advertise could result in a reduced or zero cost for registration of that program. Furthermore, scaled reductions could be offered based on the volume of advertisements that are sent by the user. That is, if the user sends 50 unique e-mail messages, they could then be entitled to a reduced registration fee whereas if they send 100 such messages, they may receive registration at no cost.

In another preferred embodiment of the present invention, instead of the advertisement being included directly in a setup software routine for a piece of hardware or software, the advertisement is accessed via the Internet. Specifically, referring again to FIG. 2, after accepting the offer to participate as an advertiser at step 230, the setup procedure includes a step 235 that accesses an advertisement server over the Internet. That server contains the latest or most updated advertisement that the company that is advertising wishes to present to the public. In accordance with this embodiment of the present invention, the advertisement can be dynamic, in that the advertisement can change periodically so that not every advertisement is the same, even for the same product. Furthermore, the advertisement could change based on geographic area, language, or the like. This embodiment of the present invention might also be more preferable as software, especially, becomes more available directly over the Internet, rather than on a CD ROM or floppy diskette, for instance as discussed above.

In accordance with yet another embodiment of the present invention, rather than providing a direct price discount on a particular product or service, a multi-level marketing system can easily be created. Preliminarily, while the present invention has been described thus far in connection with advertising a newly-attached product, the advertisement associated with the e-mail communication need not be correlated necessarily with the company that manufactures or sells that product. Rather, the advertisement embedded in the e-mail communication can be for any product or service. In the most preferred embodiment, the user of the present invention would be able to preview the advertisement to ensure that it is acceptable.

An airline frequent flyer program is one example of an implementation of the present embodiment. Airline frequent flyer programs are increasingly popular. These programs are made available primarily to promote the particular airline and have people buy tickets on that airline. Presently, under certain implementations of such programs, "miles" can be earned by using certain long distance telephone companies or by using certain credit cards. The present invention provides an even greater opportunity for an airline to promote itself.

Specifically, a user that has agreed to participate as an advertiser would "earn," for example, one mile for each e-mail that was sent that included the airline's advertisement. Such advertisement could include an invitation to the recipient to become an advertiser himself. If a recipient of that e-mail himself wanted to be an advertiser as a result of receiving the e-mail, he could sign-up directly via the Internet, for example, to also become an advertiser and indicate, automatically, or manually, that this request to participate as an advertiser resulted from receiving the original e-mail. Once that recipient becomes an advertiser, for each e-mail that he sends with an embedded advertisement therein he would earn one mile. Additionally, the original advertiser would earn, for example, ¼ mile for each embedded advertisement sent by the first recipient. In this way, the original advertiser quickly earns "miles" without even further sending out any additional e-mail messages with embedded advertisements therein.

Of course, security considerations (i.e. encryption, etc.) will be used in connection with this system to maintain and ensure the integrity of the awards to each individual participating in the multi-level marketing program. For example, well known public key cryptography techniques can be used to authenticate a message received from a party and to allocate credit to that party with little or no fear of fraud. Furthermore, were subsequent parties elect to become advertisers (thus implementing a "multi-level" advertising system), they can each be assigned a suitable digital certificate to ensure the integrity of their communications.

The present invention has been described thus far in connection with e-mail messages only. However, the present invention can be implemented with virtually any form of communication from a sender to a recipient. The present invention is applicable with facsimile transmissions, voice-over-IP services, voice mail, video teleconferencing as well as animated presentations, advertisements, and/or coupons (including virtual coupons).

As will be readily apparent from the above discussions, an advertisement for a facsimile communication could be textual, or graphical. In one preferred embodiment, the advertisement is included on a default cover page that is sent with every communication originated by a user of a specific computer system. That is, with the capabilities of modern modems to send and receive facsimile communications, many users generate and send facsimiles directly from their computers without ever printing a hard copy. In such instances, a computer generated cover page is often sent. In accordance with this embodiment of the present invention, a default cover page is generated or modified to include an advertisement during installation of a software or hardware device.

FIG. 3 illustrates one such example. In FIG. 3, a typical facsimile cover page is shown generally at 300. The cover page includes space for entering recipient, sender, date and subject information, shown generally at 310, as well as a message portion 320 that would include a message from the sender to the recipient. In accordance with the present invention, an advertisement 330 is included on the cover page. Advertisement 330 is illustrated as including both textual and graphical information, but could be limited to one or the other as readily understood by those of skill in the art. Furthermore, advertisement 330 could include a testimonial from the user, similar to that of advertisement 4 shown in FIG. 1.

For facsimile and video teleconferencing formats, a graphic and/or a relatively small amount of text can be superimposed over a portion of the viewable message. And, as the speed of the Internet increases, graphical animation advertisements can also be implemented. Thus, an advertisement could take the form of an advertisement that might already be running on the television and that advertisement could then be re-transmitted on a point-to-point basis to maximize the use of that television advertisement. Graphical advertisements can also be in the form of animation such a cartoon character that includes movement and/or sound.

In voice or aural formats, every telephone call, for example, initiated by a user who has agreed to participate as an advertiser is introduced by a relatively quick voice announcement or advertisement either about the telephone service, or even an unrelated service or product. For example, upon answering a telephone call, a recipient would receive a brief, audible indication of the long distance service used by the caller to place the call. Thereafter, the connection would be established to allow the parties to communicate. Again, for agreeing to advertise such service or product, the party initiating the telephone call may receive a discount to thus justify the inconvenience of the advertisement and possible irritation of the party receiving the call. Of course, the party initiating the call could temporarily "block" the advertisement by dialing a predetermined code, to prevent important calls from being stigmatized by the presence of the advertisement. In such case, however, the caller may not receive the discount from the service provider, unless other conditions (i.e. monthly usage, time restrictions, etc.) are satisfied.

Furthermore, when leaving a voice message on a voice mail system, the calling party could be greeted with an greeting message including an advertisement by the called party. Thus, if the party wishes to leave a voice message, he must first listen to a short statement from the party he called concerning a product or service. Again, the called party may receive a benefit, such as free voice messaging services, in exchange for his agreement to advertise. In such case, the voice messaging service could automatically append such advertisement to the voice greeting recorded by the user of the service and could vary such advertisement as necessary. Such service would be transparent to the user of the voice messaging service since only those calling him would receive the advertisements.

Conversely, prior or subsequent to leaving a voice message, a calling party could record a brief advertisement on the voice messaging system of the called party. In such case, the telephone system of the calling party could be programmed to transmit a short audible advertisement upon establishment of a connection with a remote location, similar to that described above.

In still another embodiment of the present invention, after a user accepts the offer to participate as an advertiser, no particular advertisement is, at that time, associated with any particular communication. Instead, the setup routine merely establishes a pathway to a third party Internet server. All communications flowing from the participating advertiser first pass through the third party server whereupon the appropriate advertisement is associated with the communication and the communication is thereafter sent to its originally-intended destination. One implementation with e-mail would be to replace the originally-intended recipient's e-mail address with the e-mail address of the third party. Then, once the advertisement has been embedded in the original e-mail message, the third party would re-address the original e-mail to the originally-intended recipient and send the message such that the originally intended recipient would never know that any "detour" has taken place. Preferably, no substantial delay to the e-mail transmission would be detectable, to either the sender or intended recipient.

Figure 4:
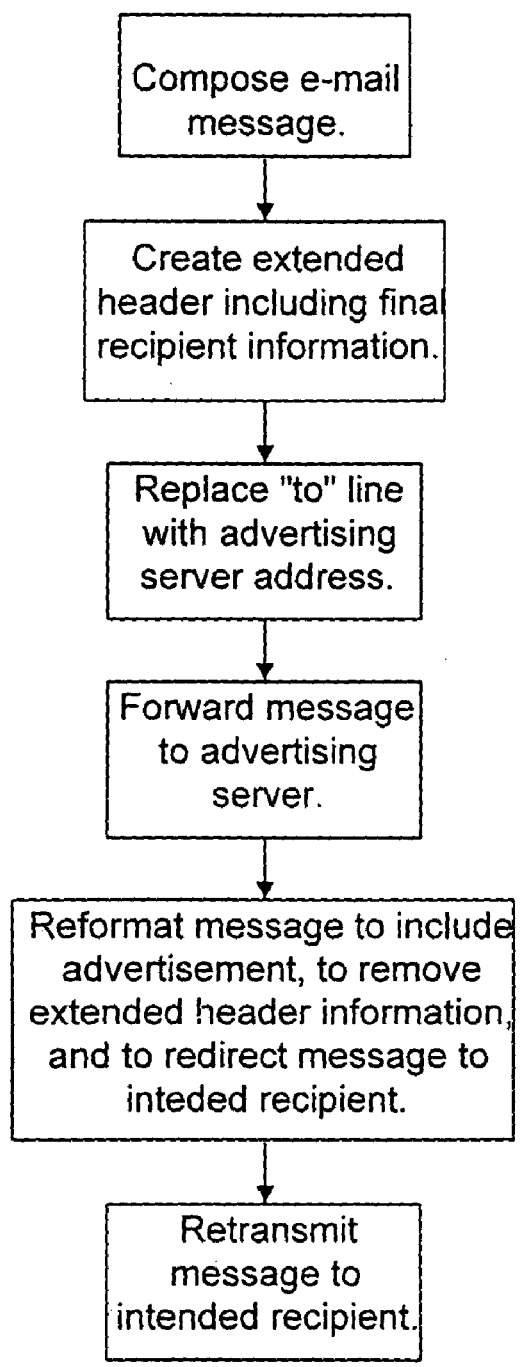
FIG. 4 illustrates a flowchart illustrating one method by which a third party advertising server embeds an advertisement in a communication in accordance with the present invention.

FIG. 4 illustrates a flowchart depicting one such embodiment of the present invention. In FIG. 4, a user has already installed software or hardware and indicated a desire to be an advertiser in connection therewith. During the installation process, the installation program identifies the e-mail client used on the system (see FIG. 2, block 250), and configures that email client to redirect email to a third party server. In this embodiment, the installation program would include in the e-mail message headers an extended header, such as "X-redirect-to," that would include the recipient information entered by the user when composing an e-mail message. The actual "to" header would be replaced with a third party advertising server address, thus forwarding all email from the user to that third party server. As readily apparent, such redirection could occur transparently to the user, who would enter a "to" address in the conventional manner. Upon receipt of the message at the third party server, the message would be modified to include an advertisement, the information from the "X-redirect-to" header field would be placed into the "to" field, and the message would be retransmitted in amended form to the intended recipient.

Referring specifically to FIG. 4, the process begins in block 400, where a user composes a new e-mail message to an intended recipient. in block 410, the e-mail client, modified as described above when the user elected to become an "advertiser," creates an extended header field including the recipient information entered by the user and inserts this field into the e-mail message. Typically, such process is transparent to the user. In block 420, the e-mail client next replaces the recipient entered by the user with a third party server address, thus causing the e-mail message and extended header information to be forwarded to that third party server. In block 430, the message is "sent" or forwarded electronically using an data transmission system, to the third party advertising server. In block 440, upon receipt by the advertising server, the message is reformatted to include an advertisement, to remove the extended header information, and to redirect the message to the intended recipient as indicated in the extended header information. In block 450, the message, including the embedded advertisement, is retransmitted for ultimate delivery to the intended recipient.

As will be readily understood, the embodiment described in FIG. 4 is particularly advantageous in that the advertisement included by the third party advertising server can be changed or updated over time as necessary in order to advertise new products or as a result in a change in advertising philosophy by the advertiser. Thus, considerable flexibility is obtained using this embodiment of the invention.

The present invention has been described in terms of presently preferred embodiments so that an understanding of the present invention can be conveyed. The present invention should therefore not be seen as limited to the particular embodiments described herein. Rather, all modification, variations, or equivalent arrangements that are within the scope of the attached claims should be considered to be within the scope of the invention.

What is claimed is:

1. A method of automatically transmitting an advertisement from a user of a data processing system to a receiving party, comprising the steps of:
   installing hardware on the data processing system, said data processing system establishing an agreement with the user of the data processing system to include an advertisement associated with the installed hardware in e-mail communications transmitted from the data processing system using an email communications application associated with the user;
   initiating an e-mail communication via said email communications application, said email communication addressed to the receiving party;
   automatically embedding an advertisement associated with the hardware in said e-mail communication in accordance with said agreement, said embedding being done with the data processing system; and
   transmitting, to the receiving party, the e-mail communication with the advertisement automatically embedded therein.

2. The method of claim 1, wherein the advertisement associated with the hardware is automatically sent for a preselected time period.

3. The method of claim 1, wherein the advertisement associated with the hardware is automatically sent up to a preselected number of times.

4. The method of claim 1, wherein the advertisement associated with the hardware is electronically obtained from a third party data processing system.

5. The method of claim 1, wherein the user is compensated for entering into the agreement.

6. The method of claim 1, wherein the advertisement associated with the identified sending party is at least one of visual and aural.

7. The method of claim 1, wherein the advertisement associated with the hardware is incorporated in setup software for the hardware.

8. The method of claim 1, further comprising offering to the receiving party of the e-mail communication and the advertisement associated with the hardware, an option of being an advertiser.

9. The method of claim 8, wherein the offer to the receiving party includes fraud avoidance means for reducing or eliminating fraud associated with a transaction.

10. The method of claim 4, wherein the advertisement associated with the hardware is electronically obtained from a third party data processing system using the Internet.

11. The method of claim 1, wherein the advertisement associated with the hardware is displayed automatically to the receiving party during a period of at least one of before, during and after the e-mail communication.

12. The method of claim 1, wherein the data processing system is at least one of a computer and telephone.

13. method of claim 1, wherein the advertisement associated with the hardware is automatically embedded in the e-mail communication by a third party.

14. The method of claim 1, wherein the advertisement associated with the hardware is automatically determined at least in part by a demographic of the receiving party.

15. The method of claim 14, wherein the demographic is at least one of location, language, gender, age, income, and physical handicap.

16. The method of claim 1, wherein automatically embedding the advertisement associated with the hardware with the e-mail communication further comprises automatically embedding a personal testimonial by the user thereby lending credibility to the advertisement associated with the hardware.

17. The method of claim 1, wherein the advertisement associated with the hardware is under the local control of the user.

18. A method of claim 1, wherein said advertisement associated with the hardwire includes a hyperlink.

19. A method of transmitting an advertisement from a user of a data processing system to a receiving party, comprising the steps of:
   installing a product on a data processing system associated with the user, said data processing system establishing an agreement with the user to include an advertisement associated with said product in communications transmitted from the data processing system using a communications application associated with the user;
   receiving a request from the user, via said communications application, to initiate a communication from said data processing system;
   automatically embedding, by said data processing system, an advertisement associated with said product with said initiated communication in accordance with said agreement; and
   transmitting, to the receiving party, said communication with said advertisement automatically embedded therein.

20. The method of claim 19, wherein the product is one of software or hardware.

21. The method of claim 19, wherein the communication is at least one of e-mail, facsimile, voice-over-IP, voice-over-Internet, voice mail, video mail, video teleconferencing, and an animated presentation.

22. The method of claim 19, wherein the embedded advertisement is electronically obtained from a third party data processing system.

23. The method of claim 19, wherein the embedded advertisement is incorporated in setup software for one of software or hardware.

24. The method of claim 19, further comprising offering to a receiver of the transmitted communication and advertisement an option of being an advertiser.

25. The method of claim 24, wherein the offer to the receiving party includes fraud avoidance means for reducing or eliminating fraud associated with a transaction.

26. The method of claim 19, wherein the user is compensated for entering into the agreement.

27. The method of claim 19, wherein the data processing system is at least one of a computer and telephone.

28. The method of claim 19, wherein the advertisement associated with the hardware is automatically determined at least in part by a demographic of the receiving party.

29. The method of claim 28, wherein the demographic is at least one of location, language, gender, age, income, and physical handicap.

30. A method of transmitting an advertisement from a user of a data processing system to a receiving party, comprising the steps of:
   subscribing to a service to be used by the user operating the data processing system, establishing an agreement with the user to include an advertisement associated with said service in communications transmitted from the data processing system using a communications application associated with the user;
   receiving a request from the user, via said communications application, to initiate a communication from said data processing system;
   automatically embedding an advertisement associated with said service with said initiated communication in accordance with said agreement; and
   transmitting, to the receiving party, said communication with said advertisement automatically embedded therein.

31. The method of claim 30, wherein the communication is at least one of e-mail, facsimile, voice-over-IP, voice-over-Internet, voice mail, video mail, video teleconferencing, and an animated presentation.

32. The method of claim 30, wherein the embedded advertisement is electronically obtained from a third party data processing system.

33. The method of claim 30, wherein the embedded advertisement is incorporated in setup software for one of software or hardware.

34. The method of claim 30, further comprising offering to a receiver of the transmitted communication and advertisement an option of being an advertiser.

35. The method of claim 34, wherein the offer to the receiving party includes fraud avoidance means for reducing or eliminating fraud associated with a transaction.

36. The method of claim 30, wherein the user is compensated for entering into the agreement.

37. The method of claim 30, wherein the data processing system is at least one of a computer and telephone.

38. The method of claim 30, wherein the advertisement associated with the hardware is automatically determined at least in part by a demographic of the receiving party.

39. The method of claim 38, wherein the demographic is at least one of location, language, gender, age, income, and physical handicap.

* * * * *